UNITED STATES PATENT OFFICE.

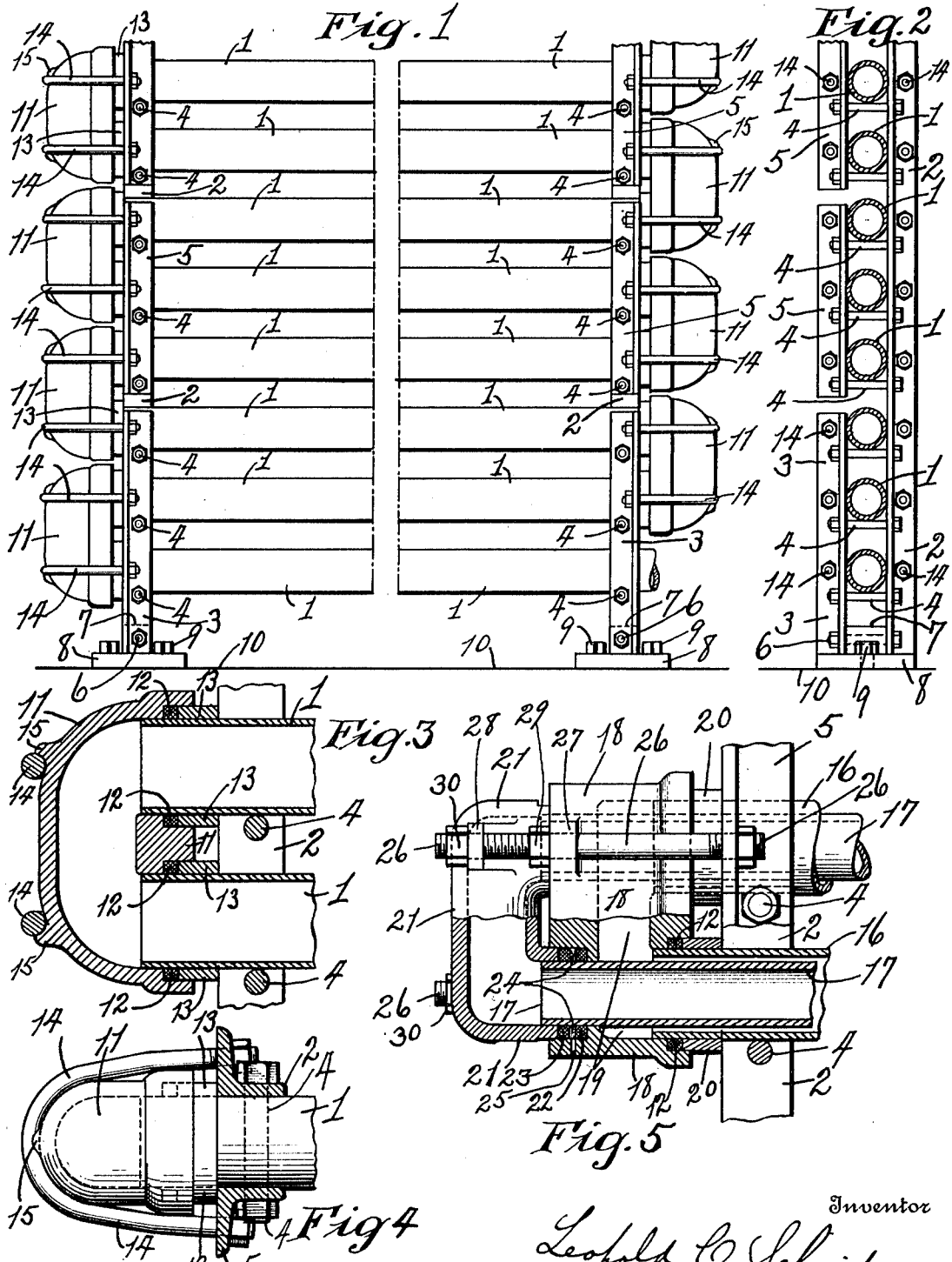

LEOPOLD C. SCHNEIDER, OF PHILADELPHIA, PENNSYLVANIA.

PIPE-COIL CONSTRUCTION.

1,012,284.  Specification of Letters Patent.  Patented Dec. 19, 1911.

Application filed March 16, 1911. Serial No. 614,868.

*To all whom it may concern:*

Be it known that I, LEOPOLD C. SCHNEIDER, a citizen of the United States, residing in the city of Philadelphia, county of Philadelphia, and State of Pennsylvania, have invented certain new and useful Improvements in Pipe-Coil Construction, of which the following is a specification.

My invention relates to single or double pipe return connections for pipe stacks or coils such as used in coolers, condensers, or in any other relation.

My invention relates to return connections, of the nature above referred to, in which the pipes themselves are blank, that is, unthreaded, and in which threaded fittings or parts are avoided, thus greatly strengthening the parts and giving them longer life, especially when used in connection with corroding or chemically active material, also cheapening the construction, and rendering the assembly and disassembly easier.

My invention resides in the features hereinafter described and claimed.

For an illustration of some of the forms my invention may take, reference is to be had to the accompanying drawing, in which:

Figure 1 is a side elevational view of a pipe stack or coil involving single pipes. Fig. 2 is an end elevational view of the same, looking from the center toward the left in Fig. 1, the pipes themselves being shown in section and the return connections omitted. Fig. 3 is a longitudinal cross sectional view through a return connection, such as shown in Fig. 1. Fig. 4 is a top plan view of the apparatus shown in Fig. 3, the support being shown in section. Fig. 5 is a side elevational view, partly in section, showing return connections for double pipe construction.

In Figs. 1 and 2, the single pipes forming the stack or coil are shown at 1. These are supported by the members 2 and 3, here shown as angle irons between which the pipes 1 are clamped by bolts 4, the pipes 1 resting also upon these bolts if desired.

As seen in Fig. 2, the right-hand member 2 is continuous, while the member 3 does not extend to the same height. The sectional members 5 are employed, in order that any particular pipes may be readily accessible. By removing any one of these sections, 3 or 5, any desired pipe is readily accessible for removal or other purpose.

Between the bottoms of the members 2 and 3 is held by a bolt 6 a projection or shoulder 7, through which the bolt 6 passes; this projection or shoulder 7 is upon the plate or member 8 which is secured by bolts 9 to the floor or other base 10. The ends of two neighboring pipes 1 communicate with the interior of a bend 11, as best seen in Fig. 3. Each end of the bend 11 is chambered out and receives packing material 12 and a ring member 13, one side or end of the ring 13 resting against the supports 2 and 5, and the other end engaging the packing 12. The ring 13 may be loose upon the pipe, or may be secured thereon, as by shrinking the ring upon the pipe. The pipes 1 extend beyond the packing 12 into the bends 11, and are blank or unthreaded. Across the top of the bend 11 extend stirrups or bolts 14 supported in place by lugs or ears 15 and pass through the supports 2, 3 or 5, and are drawn up by nuts on the rear sides of these supports. By drawing up these bolts or stirrups 14 the packing 12 is compressed snugly between the bend 11, the ring 13 and the exterior of the pipe 1, forming a liquid or gas-tight joint. By this construction, the pipes 1 need not be threaded, but are used blank, no threaded or expensive fittings are required, and by backing the packing ring, as 13, against the support and drawing the bends snugly toward the supports against the packing, a cheap, perfectly satisfactory joint is produced, which is readily accessible, readily assembled, and readily taken apart.

In Fig. 5, a double pipe return connection is shown. Here, the external pipes 16 are supported or held by the supports 2, 3, or 5, in manner similar to that illustrated in prior figures. Within each exterior pipe 16 is disposed an interior pipe 17. The annular space between the interior and exterior pipes serves for the passage of any desired medium which flows from such annular space between one pair of pipes to the annular space between a neighboring pair of pipes, through the connection member 18 having the interior passage 19 for this purpose. Surrounding each exterior pipe 16 is a ring 20, similar to ring 13 of Fig. 3. The ring 13 may be loose upon the pipe 16, or may be shrunk or otherwise secured thereon. In the end of the connection member 18 is a recess of diameter larger than the diameter of the external pipe, and between this recess and the passage 19 is an aperture of substantially the same diameter as the external pipe 16 receiving said pipe 16. The ring 20 engages in the recess and beyond the ring 20 within the recess is packing material 12. In the outer end of the connection member 18 there are two recesses, of larger diameter than the external diameter of the internal pipe 17, and between that recess and the cavity 19 is an aperture of substantially the external diameter of the internal pipe 17, such internal pipe 17 extending through this aperture and more or less into the bend 21. Within each recess there are portions of packing 22 and 23 separated by a porous washer 24, which may be made of wire gauze or any other suitable material. And around the edge of the porous washer 24 may be disposed one or more holes 25 through the wall of the connection member 18 communicating with the external atmosphere. Bolts 26, preferably two for each pair of external and internal pipes, extend through the supporting members 2, 3 or 5, and also through ears 27 upon the connection member 18 and also through ears 28 upon the bends 21. By tightening up on the nuts 29, the connection member 18 is drawn toward the supports 2, 3 or 5, thereby compressing the packings 12 against the rings 20, the latter abutting against the supports 2, 3 or 5. This compression of the packing makes a tight joint between the external pipe 16 and the connection member 18. By drawing up on the nuts 30, on the bolts 26, the bend 21 is drawn toward the connection member 18 and the support, compressing the packings 22 and 23 securely within the outer recesses in the member 18, thereby making a tight joint between the bend 21 and the internal pipe 17, and a tight joint between pipe 17 and connection member 18. The washer 24 withstands this compression and while under this compression is, nevertheless, porous, so that if there should be any leakage of ammonia or other material from the cavity 19 through the joint formed by packing 22, it may escape through the porous washer 24 and thence through the opening or openings 25 and be detected by its odor or by any other means of detection. Here, again, it is obvious that return connections for double pipe arrangements are provided which employ only blank or unthreaded pipes, and unthreaded parts, which are easily assembled, cheaply made, easily accessible, and easily taken apart.

It is to be understood, of course, that the double pipe arrangements of Fig. 5 may be supported on supports similar to those shown in connection with Figs. 1 and 2, or may be supported in any other suitable relation. When supported as shown in Figs. 1 and 2, the double pipe arrangements may have the external pipes 16 clamped between the supporting members and may rest upon the clamping bolts 4.

What I claim is:

1. In apparatus of the character described, the combination with a pipe, of a support therefor, a connection member into which said pipe extends, said connection member having a recess surrounding said pipe, a packing ring engaging in said recess and abutting against said support, and means for clamping said connection member to said support.

2. In apparatus of the character described, the combination with a pair of neighboring pipes, of a support therefor, a connection member for connecting the interiors of said pipes together, said pipes extending into said connection member, said connection member having a recess around each of said pipes, packing rings abutting against said support and engaging in said recesses, and means for clamping said connecting member to said support.

3. In apparatus of the character described, the combination with a pair of neighboring pipes, of a support therefor, a connection member for connecting the interiors of said pipes together, said pipes extending into said connection member, said connection member having a recess around each of said pipes, packing rings abutting against said support and engaging in said recesses, means for clamping said connection member to said support, said support comprising members disposed on opposite sides of said pipes, and means for clamping said members against said pipes.

4. In apparatus of the character described, the combination with a pipe, of a support therefor, a connection member into which said pipe extends, said connection member having a recess surrounding said pipe, a packing ring engaging in said recess and abutting against said support, means for clamping said connection member to said support, said support comprising members disposed on opposite sides of said pipe, and means for clamping said members against said pipes.

5. In apparatus of the character described, a plurality of pipes disposed side by side, a supporting member on one side of all said pipes, sectional members on the opposite side of said pipes, and means for clamping said sectional members and said supporting member against said pipes.

6. In apparatus of the character described, the combination with a supporting member, of a pair of pipes supported thereby, a connection member for connecting the interiors of said pipes, means for forming a joint between each of said pipes and said connection member, and means for holding said connection member to said supporting member.

7. In apparatus of the character described, an external pipe, an internal pipe within the same, a connection member forming a connection with the interior of the external pipe, a second connection member forming a connection with the interior of said internal pipe, means for forming a joint between said external pipe and said first mentioned connection member, means for forming a joint between said internal pipe and said second connection member, a support for said pipes, and means for drawing said connection members toward said support for tightening said joints.

8. In apparatus of the character described, the combination with a supporting member, of an external pipe, an internal pipe within the same, a connection member forming a communication with the interior of said internal pipe, a packing ring abutting against said supporting member and engaging in a recess in said connection member, means for drawing said connection member toward said supporting member to tighten the joint formed by said packing ring, and a second connection member forming a connection with the interior of said internal pipe.

9. In apparatus of the character described, the combination with a supporting member, of an external pipe, an internal pipe within the same, a connection member forming a communication with the interior of said internal pipe, a packing ring abutting against said supporting member and engaging in a recess in said connection member, means for drawing said connection member toward said supporting member to tighten the joint formed by said packing ring, a second connection member engaging in a recess in said first mentioned connection member and forming a joint for said internal pipe, and means for drawing said second connection member toward said support to make said joint tight.

10. In apparatus of the character described, the combination with an external pipe, an internal pipe within the same, a connection member forming a joint with the interior of said external pipe, a second connection member engaging in a recess in said first mentioned connection member, the interior of said internal pipe communicating with the interior of said second connection member, a plurality of packings in said recess, porous material separating said packings, a communication from said porous material to the external atmosphere, and means for drawing said second connection member toward said supporting member, whereby joints are formed between said first connection member and said internal pipe, and between said internal pipe and said second connection member.

11. In apparatus of the character described, the combination with a blank external pipe, a blank internal pipe within the same, a connection member forming communication with the interior of said external pipe, means for forming a joint between said connection member and said external pipe, a second connection member engaging in a recess in said first mentioned connection member and forming a joint with said internal pipe, a support for said pipes, and means engaging said support and drawing said connection members toward said support.

12. In apparatus of the character described, the combination with a blank external pipe, a blank internal pipe within the same, a connection member forming communication with the interior of said external pipe, means for forming a joint between said connection member and said external pipe, a second connection member engaging in a recess in said first mentioned connection member and forming a joint with said internal pipe, a support for said pipes, and means engaging said support and drawing said connection members toward said support for tightening said joints.

13. In apparatus of the character described, the combination with an external pipe, an internal pipe within the same, a connection member forming a connection with the interior of said external pipe, a second connection member forming a connection with the interior of said internal pipe, said second connection member engaging in a recess in said first mentioned connection member, and separated packings in said recess forming respectively joints between said first and second mentioned connection members and said internal pipes.

14. In apparatus of the character described, the combination with an external pipe, an internal pipe within the same, a connection member forming a connection with the interior of said external pipe, a second connection member forming a connection with the interior of said internal pipe, said second connection member engaging in a recess in said first mentioned connection member, and separated packings in said recess forming respectively joints between said first and second mentioned connection members and said internal pipes, said first mentioned connection member having a perforation to the external atmosphere communicating with the space between said separated packings.

In testimony whereof I have hereunto affixed my signature in the presence of the two subscribing witnesses.

LEOPOLD C. SCHNEIDER.

Witnesses:
 JOHN T. GRIFFINBERG,
 AMBROSE GRIFFENBERG.